July 28, 1931. C. W. MOORE 1,815,953
DENTAL UNIT
Filed Nov. 6, 1928 5 Sheets-Sheet 1
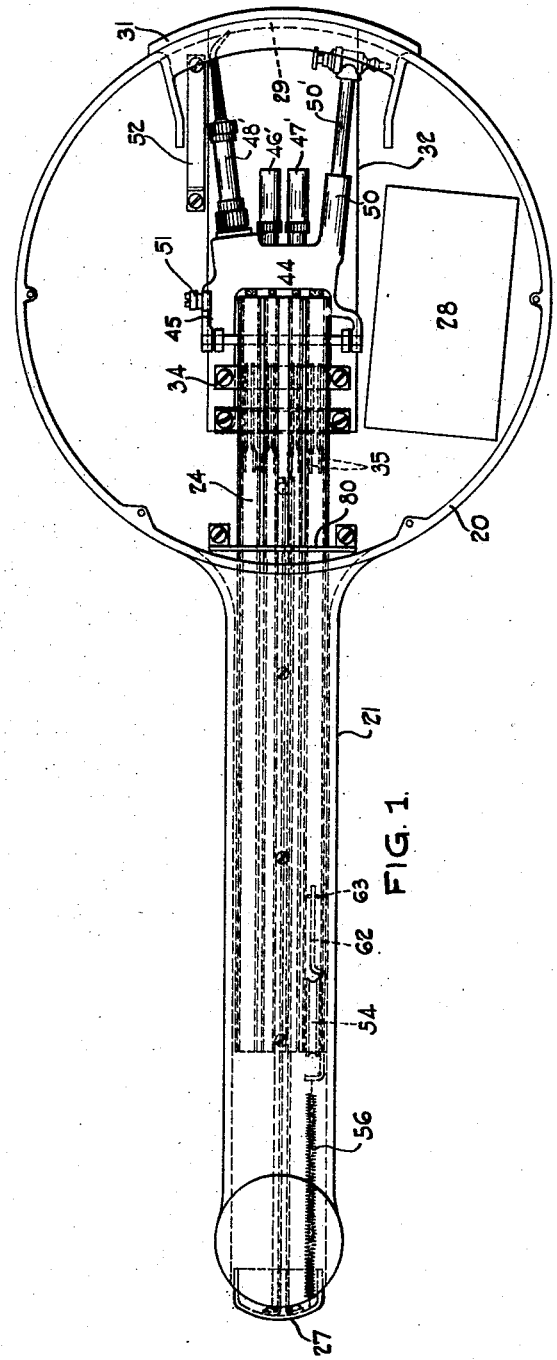
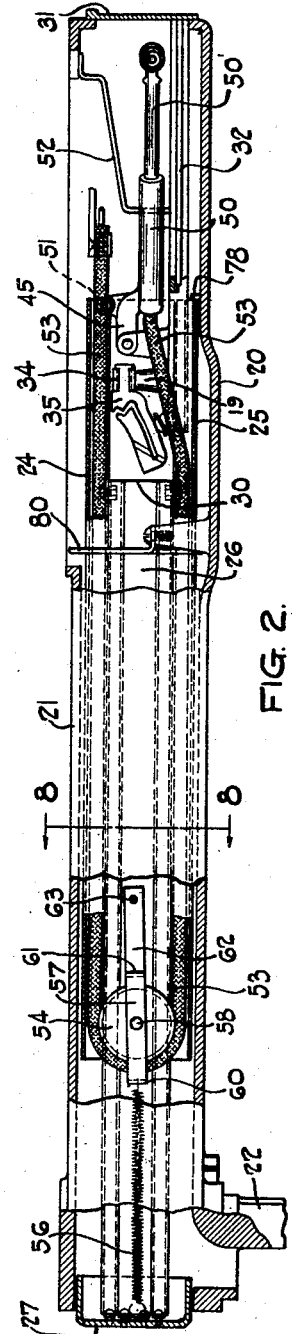
INVENTOR.
CLARENCE W. MOORE.
BY Frank H. Borden
ATTORNEY.

July 28, 1931.　　　C. W. MOORE　　　1,815,953
DENTAL UNIT
Filed Nov. 6, 1928　　　5 Sheets-Sheet 2
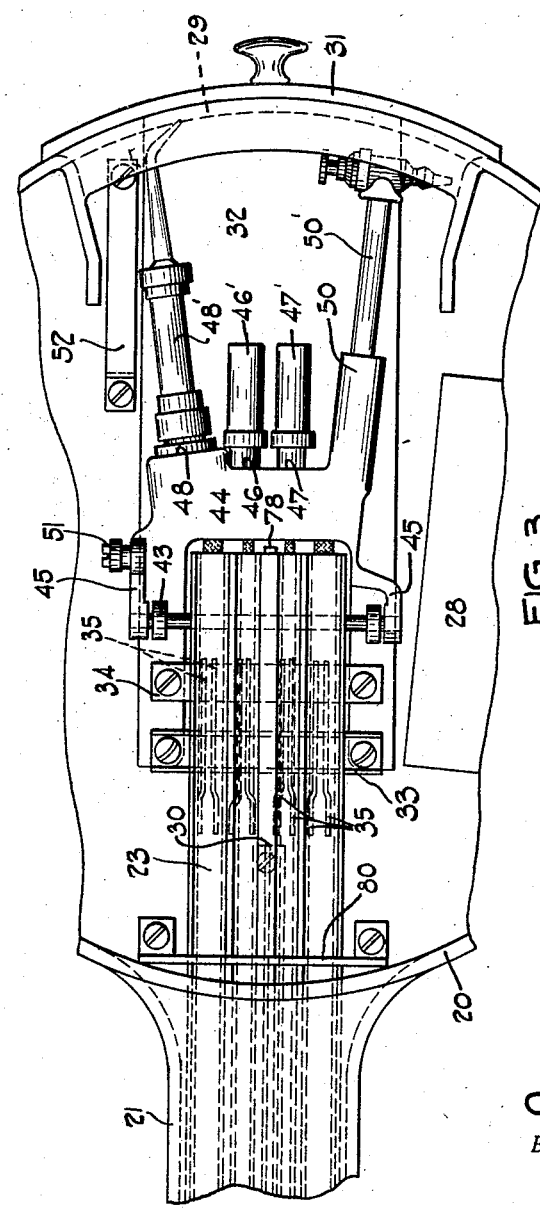
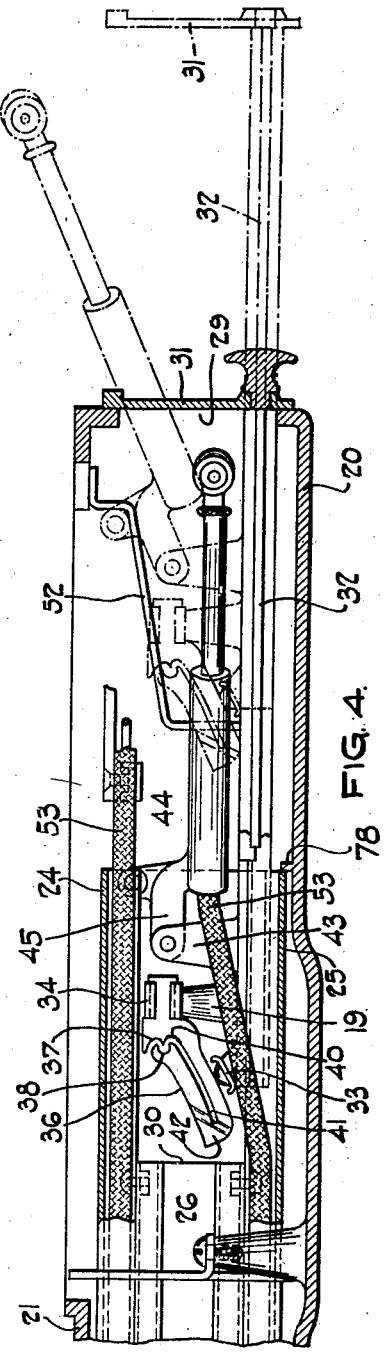
INVENTOR.
CLARENCE W. MOORE.
BY Frank H. Borden
ATTORNEY.

July 28, 1931.  C. W. MOORE  1,815,953
DENTAL UNIT
Filed Nov. 6, 1928  5 Sheets-Sheet 3
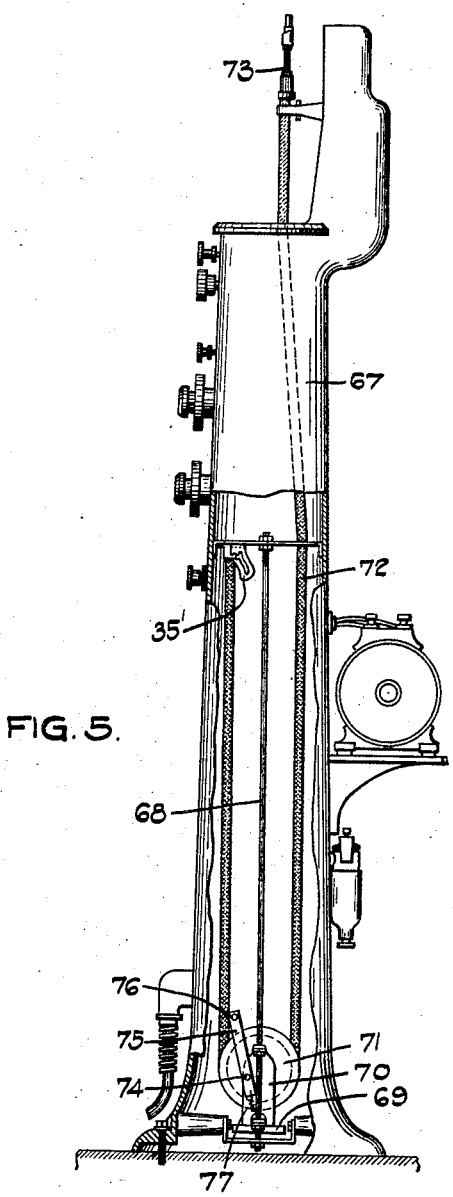
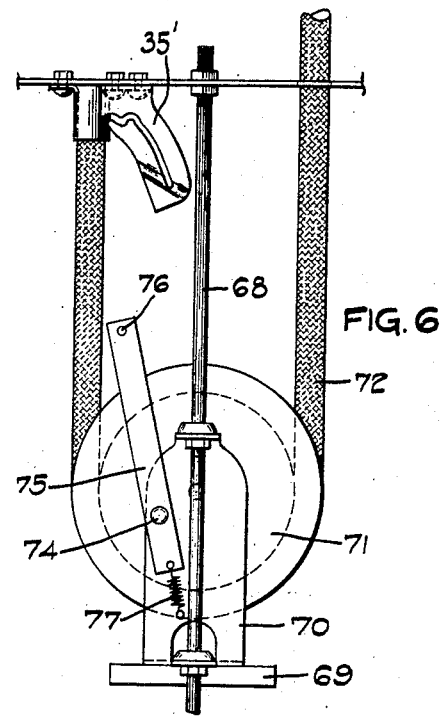
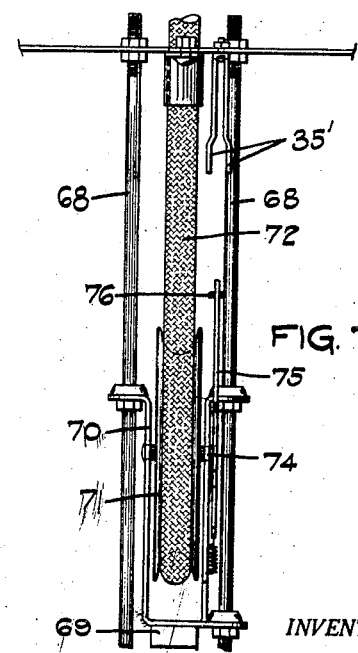
INVENTOR.
CLARENCE W. MOORE.
BY Frank H. Borden
ATTORNEY.

July 28, 1931.　　　C. W. MOORE　　　1,815,953
DENTAL UNIT
Filed Nov. 6, 1928　　　5 Sheets-Sheet 4

INVENTOR.
CLARENCE W. MOORE.
BY Frank H. Borden
ATTORNEY.

July 28, 1931.  C. W. MOORE  1,815,953
DENTAL UNIT
Filed Nov. 6, 1928  5 Sheets-Sheet 5

INVENTOR.
CLARENCE W. MOORE.
BY Frank H. Borden
ATTORNEY.

Patented July 28, 1931

1,815,953

UNITED STATES PATENT OFFICE

CLARENCE W. MOORE, OF ROSLYN, PENNSYLVANIA, ASSIGNOR TO OSCAR H. PIEPER AND ALPHONSE F. PIEPER, BOTH OF ROCHESTER, NEW YORK

DENTAL UNIT

Application filed November 6, 1928. Serial No. 317,540.

This invention relates to dental units.

Among the objects of the invention are; to improve the construction of dental units; to provide in a dental unit means for positively locking the instrument cords in an extended position; to provide an improved tension controlling device for dental units such that the instrument cords are relieved of tension during the use of the instrument regardless of the velocity with which the cord is withdrawn from the unit; to improve the tension controlling mechanism of dental units whereby the tension on the cords is automatically and positively relieved when the cord is fully extended from the unit and which automatically applies the tension to the cord in response to actuation of the cord itself; to simplify and reduce the cost of the retrieving mechanism of dental units; to provide in a bracket table dental unit improved means for supporting and guiding the instruments and cords; to provide in a dental unit means permitting quick and simple replacement of the instrument cords; to render a more compact assembly of instruments in a dental unit; and many other objects and advantages as will be more apparent as the description proceeds.

This invention, while in certain aspects of general application, constitutes in several respects an improvement over Patent #1,491,739, issued April 22, 1924, to Percy Russell, as will be particularly pointed out herein. In the preferred form the invention is embodied in a bracket table dental instrument of the same general characteristics as the Russell device alluded to above, although it will be pointed out further that certain portions of the invention pertain to other forms of dental units.

Figure 8:
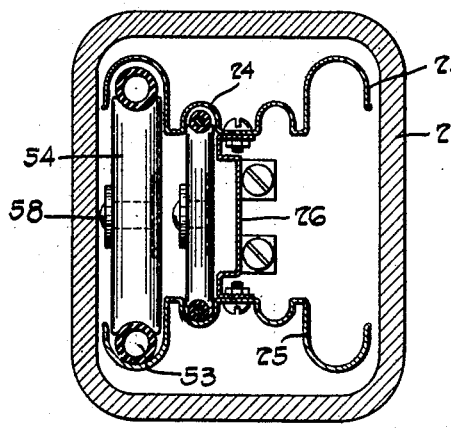
Figure 10:
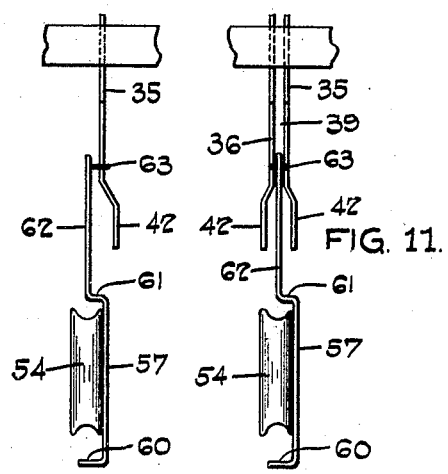
Figure 9:
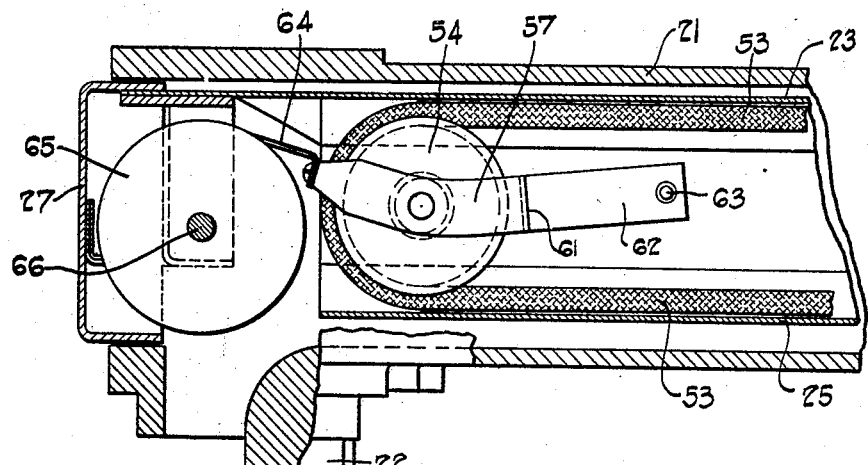

In the accompanying drawings, forming a part of this specification:

Fig. 1 represents a top plan of a bracket table instrument assembly, with the cover plate removed to disclose the arrangements within the bracket table, and showing the cord housing and guiding channels in dotted lines in the hollow arm of the bracket table, Fig. 2 represents a side elevation of the same, partially broken away to disclose features of the invention, Fig. 3 represents a fragmentary enlarged plan of the bracket table according to this invention, Fig. 4 represents a side elevation of the same, but partially in section, with the instrument guides shown in their extended position relative the casing of the bracket table, in dotted lines, and showing the tension regulating or controlling elements in their secondary adjusted position in dotted lines, Fig. 5 represents an elevation of a different type of dental unit broken away to show the application of the tension controlling latch of this invention, Fig. 6 and Fig. 7 represent enlarged detail elevations of the tension controlling latch mechanism and the retriever mechanism of the dental unit shown in Fig. 5, Fig. 8 represents a vertical section through the arm of the bracket table dental instrument assembly shown in Fig. 1, disclosing the improved trough or channel construction therein, Fig. 9 represents a fragmentary side elevation of a modified form of retrieving device for the cords and instruments of the dental unit, Fig. 10 represents a top plan of a modified form of tension controlling latch mechanism according to the invention, Fig. 11 represents a top plan of the preferred form of tension controlling latch mechanism according to the invention, and Figs. 12 to 17, inclusive, represent diagrammatically the successive positions of the latch pin relative the tension controlling latch mechanism in its cycle of movements.

The bracket table instrument assembly shown in the Russell patent previously noted, while affording a highly useful and efficient dental sub-unit which as been accorded favor in the art, had certain disadvantages which are eliminated by this invention. For instance, in the Russell construction, a point of wear and thus of possible trouble existed in the retrieving mechanism whereby the instrument cords were pulled back into the casing after use by the operator. For this purpose Russell used a clock-spring actuated drum with a tape of metal wound on the drum and connected with the sheave of the retrieving device. The tape was subject to breakage, as was the spring, and required replacement sometimes. In the instant invention although it is contemplated that a clock-spring drum may be used as shown in Fig. 9, yet the drum is improved to allow winding of a wire rope or cable thereon. The Russell construction was sometimes ineffective in operation owing to the precise movement of the instrument cord essential to latching the drum against unwinding according to the pawl arrangement of that pattern. If care was not used in extending the instrument and cord from the unit, the pawl might not seat, the tension would remain and the cord would unexpectedly be returned into the unit with an upsetting effect upon the patient and operator. To effect a positive latch, regardless of the velocity with which the cord is extended, the invention herein is directed. This phase of the invention is of course susceptible to wider ranges of application, inasmuch as the same principle and construction can be applied to other types of dental units, as particularly shown in Figs. 5, 6 and 7, and as will be pointed out further herein. The Russell construction, moreover, provided a rather involved construction of channel members for receiving and guiding the cords and the retrieving mechanism, which rendered it difficult to change the cords in the event of failure or wear, and this invention simplifies that construction and enables quick and easy replacement of the cords as will be pointed out. The Russell bracket table instrument assembly included among its features the mounting of the improved sub-unit upon a main pedestal of the dental unit, and which was arranged for subsequent attachment. To this end it is desirable that attachment be of the simplest nature, particularly as regards the wiring. In the past the Russell construction has involved a casing of the bracket table so full of instruments, switches, cords, guides, and such, that it has not been feasible to dispose the transformer for the low voltage instruments in the casing itself, but this has, in the past, been disposed in the pedestal of the dental unit, or at some other remote position, such that it has required a multiple cable extending from the instruments in the casing to the transformer, complicating the wiring and necessitating skill in effecting the attachment of the sub-unit of the bracket table with the main unit. The invention herein so simplifies the construction as to enable the disposition of the transformer for the instruments in the casing with the instruments, thus providing for the extension of ordinary high voltage, (house and office lighting current) into the casing as the only wiring emerging therefrom, with all of the transformer wiring connections established in the factory prior to shipment. There are other features of advantage over the previous constructions that will be pointed out as the description proceeds.

It is preferred to provide a bracket table casing 20, of conventional construction, joined to and forming a continuation of a hollow arm 21, which arm carries a pintle 22 for pivotally supporting the arm, and which is hollow to house conductors extending into the arm and casing. The hollow arm 21 receives and houses a plurality of troughs or guides or channels 23, as shown in Figs. 2 and 8, and which are preferably formed of upper and lower stampings 24 and 25 respectively, rigidly held in spaced relation by a vertical web 26, riveted or welded to the parallel spaced trough members or stampings. The stampings have identical and opposite grooves or channels, the opposite pairs of which define the channels or grooves in which a particular instrument cord and its sheave will lie and move, as will be clear, especially in view of Fig. 8.

The stampings and web extend from the arm into the casing forwardly, and rearwardly through the arm to a point spaced from the end of the arm 21, where the stampings terminate while the web is carried on rearwardly to bolted or riveted connection with the arm plug 27, slidably disposed in the end of the arm 21. The simplicity of the channel construction of this invention relative the original Russell construction will be apparent. The channel assembly as a rigid unit is slidably disposed in the hollow arm 21. At the forward end, in the casing, the web 26 terminates just beyond the jointure of the arm and casing, while the channel stampings are carried on further into the casing, toward the front edge thereof but terminating appreciably short thereof.

Although it will be obvious that the channel construction of the bracket table instrument assembly may be as shown in the Russell patented construction, and the same number of instruments may be used as in that construction, yet it has been found that by providing improved and interchangeable instruments the number of instrument handles and cords normally necessary for free and proper use of the dental unit may be reduced to four, namely two electric instruments, using small cords, obviously, and one air instrument using air solely, and one air and electric instrument, or a total of four instruments. The disposition of the channels in the arm, as shown in Fig. 8, may be such as to place the air instruments at the outer edges, and with the smaller electric cords for the electric instruments in the center, which as shown provides ample clearance between the lower surface of the channel members and the floor of the hollow arm 21 to house such energy conductors as may be necessary.

As shown in Fig. 1, the channel construction and the instrument guide and holder are of such compactness that there is adequate space to receive and house a transformer, such as is indicated at 28. As the transformer, connections, and switch mechanisms have no bearing upon the instant invention, they have been omitted from the disclosure as far as details are concerned.

As noted, the web 26 terminates just inside of the casing between the channel stampings, as at 30, leaving a clear space between the channel members from the end of the web to the end of the stampings. This space is to receive certain movable elements of the instrument assembly, including the improved tension regulating or controlling latch mechanism of this invention, and is the preferred form of construction.

The outer surface of the casing is provided with an aperture 29 diametrically opposite the connection of the hollow arm with the casing, so that the aperture is in substantial registry with the hollow arm 21. The opening 29 is closed or covered by a drawer front 31, rigidly connected to a slide, or drawer bottom 32, extending substantially parallel with the lower surface of the casing and suitably guided and supported as to be slidably pulled through the aperture or opening 29 to expose the instruments and permit their withdrawal from the casing. The rear end of the drawer slide 32 preferably extends into the space between the upper and lower stampings for the channel members, in spaced relation to the end 30 of the web joining the stampings, in its normal closed and housed position.

The plate 32 carries toward its rear end the transverse, inclined depressor 33, arranged to guide the connectors or cords into their respective channels in the stampings in the hollow arm 21, as well as into the movable guides to be described. The transverse bar has no positive action, but simply serves as an abutment with which the cords contact.

Adjacent the depressor or bar 33, on the plate 32, toward the front thereof, are a pair of spaced transverse elevated plates 34, oppositely slotted to receive and hold rigidly the ends of pairs of latch plates 35. It is preferred that the plates 35 be arranged in pairs, although, as shown in Fig. 10, a single plate may be used for each instrument and its cord. Each pair of plates is maintained in spaced parallel relation to adjacent pairs, in a battery assembly, and the individual plates are separated by a space 39 which is coextensive with a vertical plane passing through the approximate center of the respective channels of the stampings in the hollow arm 21.

Each plate of a pair is slotted and bent as later is described to cooperate with its mate in effecting mechanism suitable for controlling the tension of the cord on the instrument by successive pulls on the instrument. Each pair comprises a guide surface 36, a primary stop recess 37, a latch recess 38, a secondary stop recess 40, and a guide channel or slot 41 terminating in the respective plates just beyond oppositely flared inclined flanges 42. It will be observed that owing to the direction of the flare on the respective plates that the clearance between the flanges effects an enlargement of the space 39 between the plates 35. It will be understood that a pair of latch plates 35, in the preferred form, will be provided for each instrument and cord used in the unit. It will be understood that the elevated plates 34 supporting the pairs of latch plates 35, will be rigidly mounted on the drawer plate 32 as by means of spaced vertical studs 19 mounted on plate 32.

In the Russell construction previously noted, the instruments were slidably mounted in individually pivoted holders, and so arranged that oscillating the holder tripped or actuated a switch controlling the circuit through the particular instrument. It is contemplated that such construction may be used in connection with the mechanism heretofore described, if desired. In the interests of compactness and simplicity, however, it is preferred that the instrument holder to be described will be used.

Vertical studs 43 are provided on each side of the sliding element 32, connected to the drawer front 31, and spaced by the end of the channel members. To the studs a guide casting 44 is pivotally attached by means of ears 45. The guide casting has, preferably, two central openings 46 and 47 respectively, slidably receiving and holding electrical instruments of which the handles only are shown in Figs. 1 and 3, as at 46' and 47' respectively. The guide casting is provided on each side of the central openings with air instrument receptors, such as an opening 48 for the hot air syringe, and a sleeve 50 for the "cut-off" for the spray bottles of the unit. Although the several openings in the guide casting are preferably extended through the casting, they are not arranged in parallelism, but converge on the inner side of the casting, and diverge on the side toward the drawer front so that when brought to operative position they are in such spaced relation as to permit the ready grasp of the instrument by the fingers. It will be understood that the air instrument receptors, 48 and 50 are arranged to receive, removably, the appropriate air instruments 48' and 50' as disclosed. In the normal housed position the instruments are arranged in substantially a horizontal plane parallel with the plate 32, with the ends of the instruments well below the upper edge of the door front 31. In order to place the instruments in position for the operator to grasp a desired instrument means are provided for swinging the guide casting and the instruments with it, upwardly. This may be accomplished by the mechanism disclosed in Figs. 3 and 4, by the provision of a laterally extending roller 51 mounted on the guide casting or instrument holder, in such position as to impinge upon a stationary inclined track 52 rigidly mounted in the casing. It will be clear that as the drawer or slide is moved through the aperture 29, the roller 51 will ride up on the track 52, swinging the guide casting upon its horizontal axis and elevating the fan shaped battery of instruments to proper grasping position. It is to be noted that the roller 51 is normally spaced from the track 52 to a degree sufficient to insure that the ends of the instruments are beyond the casing edge, before moving them upwardly.

Connecting the several instruments with sources of energy, are a plurality of cords or connectors, such as 53. The connectors are well known in the art, and may comprise electric connectors, air connectors, or a combination of both. Each cord 53 is attached in a well known manner to the inner end of an appropriate instrument. In the disclosure of Fig. 4, the cord passes out of the rear end of the guide casting, the opening of which is at a slightly higher level than the lower stamping or channel level, extending under the transverse depressor bar, and lies in its appropriate channel. Toward the rear end of the hollow arm 21 the cord 53 passes about a sheave or roller 54, and passes then toward the casing in the upper groove or channel of the stampings to a convenient point in the casing where it is anchored or fastened in such manner as to form a permanent terminal for leads extending to a transformer, or switches or rheostats, such as are common in the art. In this form described, the anchorage for the cord is at the top and the cord is withdrawn with the instrument from the bottom. It is contemplated that the disposition of the cords and their attachment to the leads may be as disclosed in the Russell patent, with the instrument and cord extended from the upper level, and the anchorage for the cord at a lower level, in convenient position for such electrical and other connections as may be desired for the particular instrument. It will be clear that as in the Russell construction, the sheave 54 is of such diameter that with the cord in position the sheave is guided forward and backward in its proper channel during the operation of the dental unit.

In order to retrieve the cord and instrument so that the instrument enters the instrument holder or guide casting during the non-use of the appropriate instrument tension devices are provided.

The tension device may be the same as that of the Russell construction, or a modification thereof as shown in Fig. 9, to be later described. A further modification as shown in Figs. 5, 6 and 7 utilizing the force of gravity is also contemplated, as will also be further described.

It is preferred, however, to use the simple and efficient device disclosed in Figs. 1, 2, and 12 to 17 inclusive, in which a tension coil spring 56 is connected to the arm plug 27, preferably at a low level, at one end, and at the other connected to the sheave 54, constantly urging the sheave toward the plug 27, thus placing the cords under tension. While this connection to the sheave may be effected in any desired manner, it is preferred to use a pivoted arm connected to the axis of the sheave, with the free end of the arm beyond the sheave cooperating with the latch mechanism to effect a tension regulator or control. Thus a latch arm 57, pivoted freely on the axis of the sheave at 58, has an inturned flange 60 to which the other end of the coil spring 56 is attached, with one end of the spring attached to the arm plug at a lower level than the plane of the horizontal axis of the sheave. The latch arm extends in parallelism with the side of the sheave for a distance past the edge of the sheave, where it is bent inwardly as at 61, and the free end 62 extends toward the latch plates in the casing. The free end 62 is of such thickness as to pass readily into the space 39 between the plates of a pair of latch plates 35, and is maintained in constant registry with this space.

The free end 62 of the latch arm carries a transverse latch pin 63 of a length greater than the width of an assembled pair of latch plates 35, but less than the width of the space 39 where it is enlarged owing to the oppositely flared flanges of the plates of the pair. The latch pin 62 is resiliently maintained in a plane of travel such as to normally present the latch pin to the latch plates at a level higher than the level of the axis 58 of the sheave, but lower than the level of the secondary stop recess 40 of the latch plates 35. This may be achieved by lowering the plug end of the spring, or by bending the latch arm 57, as will be evident.

It will be understood that there will be a separate retrieving mechanism for each cord and instrument, as there are also separate tension controlling devices for each.

In the operation of the parts so far described, with the parts disclosed in Figs. 1, 2 and 3, as well as in full lines in Fig. 4, the first step is to slide out the drawer, to the position shown in dotted lines in Fig. 4. As the plate 32, of the drawer, carries with it the transverse depressor bar 33, the latch plates 35, and the pivotal supports for the guide casting, these all move forward together against the tension of the coil springs 56 transmitted through the cords to the instruments, which, mounted in the guide casting are moved forward also. It will be understood that suitable latching mechanism for maintaining the drawer in open position will be provided. As the opening continues, the roller 51 impinges against inclined track 52, thus swinging the instrument holder and the instruments to a position for the operator to grasp a desired instrument.

Figure 12:
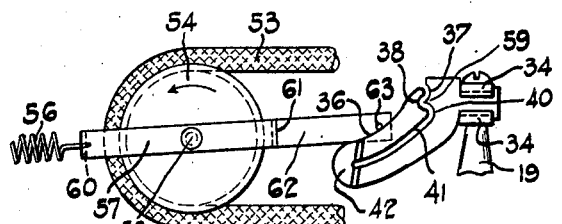

The second step comprises a selection of an instrument thus exposed and grasping same manually and pulling it from the guide casting or holder. This instrument may be withdrawn at any rate of speed desired, and is continued until a positive stop is had to the outward movement, when the cord is released and the tension control removes the tension from the cord, thus enabling the operator to use the instrument. As the instrument is pulled out of the casing, dragging the attached cord with it, the sheave is rotated and pulled forward with the cord, against the tension of the coil spring, and the latch arm, of course, is moved forward with the sheave. Continued outward movement causes the free end of the latch arm to enter the space 39 between the appropriate pair of latch plates 35, then resulting in the impingement of the latch pin 63 upon the upwardly inclined guide surfaces 36 of the latch plates. The pin 63 begins to rise on the guide surfaces as the outward or withdrawing movement is continued as indicated in Fig. 12. Elevation of the transverse latch pin 63 raises the free end 62 of the latch arm 57, against the resilient resistance of the tension spring 56, which tends to maintain the normal horizontal positioning of the latch pin on the latch arm. Continuation of the pull causes the pin to travel over the upper end of the guide surface of the latch plates and to enter the slot forming the several recesses at the entrance to slot 41. The resilient impulse of the pin 63 is downward as soon as the restraining and guiding surface 36 is passed, which coupled with the withdrawing pull on the instrument causes the pin to abut and be positively stopped by seating in the primary stop recess 37. The primary and secondary stop recesses are separated by a dwell or point 59, preventing the pin from passing directly from one to the other vertically. This marks the termination of the outward pull on the instrument, further movement being positively stopped, and this limitation occurs regardless of the speed of the withdrawal. The instrument is then released by the operator, but the transverse pin moving rearwardly and downwardly under the influence of the tension device passes into positive stopping relation to the latch recess 38 in the latch plates. The tension on the sheave is thus taken directly by the latch plates, and removed from the cord. The operator is then free to use the instrument without danger of its sudden withdrawal from his grasp. The use of the instrument being concluded, the operator gives the instrument a little tug outwardly, moving the latch pin out from its seat in the latch recess, and, under the resilient influence of the tension spring, moving it forwardly and downwardly into the secondary stop recess 40, effecting a further positive stop to its outward movement. Release of the instrument at this point, the tension of the coil spring now having attached to the cord again, and still under the downward influence of the tension spring, the pin 63 passes into the slot 41, in which it is guided by the inclination of the slot, downwardly. As the pin moves in the slot the continued downward movement of the pin causes it to pass from a position where the resilient influence is downward, through its position of normal rest, to a lower level where the resilient influence is upward, so that by the time it reaches the end of the slot 41, the impulse is upward so that the pin, and the arm to which it is attached upon release from the slot, by passing into the larger area of the space 39 between the plates, effected by the outward flare of the flanges 42, springs upwardly as the sheave moves rearwardly, completely released from engagement with the latch plates.

Figure 13:
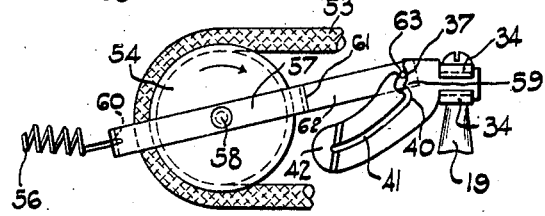
Figure 14:
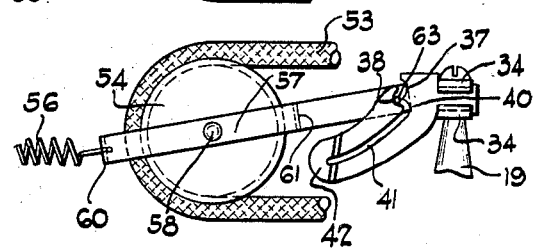
Figure 15:
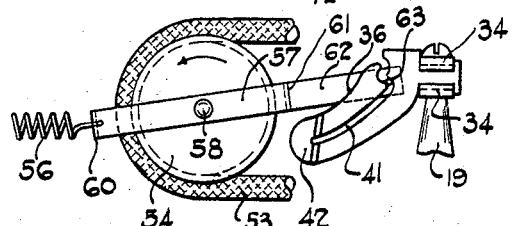
Figure 16:
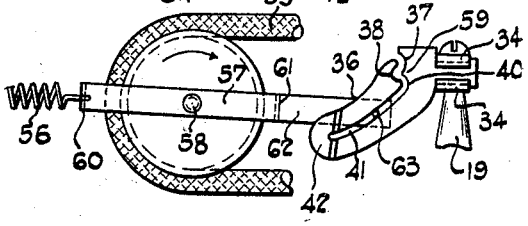
Figure 17:
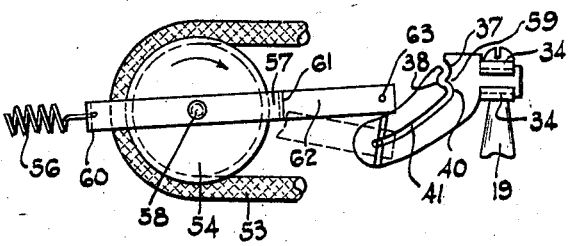

The cycle of operations just described will be clear, it is believed, but the several positions are indicated in the Figs. 12 to 17 inclusive. In Fig. 12, the pin has just begun to move upwardly on the guide surfaces of the latch plates. In Fig. 13 it has passed into the primary stop recess. In Fig. 14, it has seated in the latch recess. In Fig. 15 it has seated in the secondary stop recess, in Fig. 16 it has started its passage through the slot 41, and in Fig. 17 it has reached the end of the slot, and in dotted lines, has sprung upwardly free of the latch plates.

In the retrieving mechanism shown in Fig. 9, the sheave 54, has a similar latch arm 57 pivoted to it, as in the preferred form, but the rear end thereof has a cable 64 connected to it. This cable is wound upon a spring actuated drum 65, rotatably mounted on a shaft 66. The cable is of such diameter as to permit several turns to lie against the periphery of the drum before winding upon itself on the drum. The devices and mechanisms for effecting tension on the instrument cord are manifestly of wide range, and it is to be understood that all such are contemplated in connection with the other portions of the invention herein set forth.

There is a well known type of dental unit, in which the instruments, instead of being mounted in a horizontally extending casing, are supported on a vertical pedestal with the cords for the instruments depending within the pedestal. Such a dental unit is disclosed in Fig. 5, and the retrieving device of this unit is a guided weight maintaining the tension on the cord through the force of gravity. The pedestal 67 has for each instrument a pair of spaced vertically extending guide rods 68, (Fig. 7), upon which a sheave journal 70 is slidably mounted. The sheave journal may have a depending weight 69 and rotatably supports a sheave 71, about which an instrument cord 72 is passed, anchored at one end relative the pedestal, for attachment of lead connections, etc., and at the other attached to an instrument 73. Pivoted to one cheek or leg of the journal 70, as at 74, is a latch arm 75, carrying a cross pin 76 at its free end, and resiliently held in a predetermined path of travel by a tension spring 77.

Latch plates 35' are interposed in the path of travel of the latch arm 75, so that upward movement of the sheave results in the engagement of the latch arm with the latch plates and the controlling of the tension on the cord, as will be clear.

It will be understood that the operation of the tension controlling mechanism in the dental unit disclosed in Figs. 5, 6 and 7, will be the same as in the other types disclosed. It may be noted, also, that the provisions of a separate device for maintaining the resilient positioning of the transverse latch pin, apart from the retrieving tension device, as shown in Figs. 5, 6 and 7, is in contemplation with regard to the preferred form of dental unit disclosed.

The many advantages of the improvements effected herein will, it is thought, be apparent, as will the fact that the modifications available are of wide range, and such are to be construed as within the scope of the invention. There is an additional factor of advantage that should be brought out, namely, the ease and facility with which new cords may be inserted and attached to the instruments and the retrieving devices.

With the invention as disclosed in Figs. 1 and 2, the change of any desired cord is effected by extending or withdrawing the attached instrument to its greatest extent, and locking the latch arm to the tension regulating latch plates, as will be clear. The forward movement of the channel members or stampings with the cords and instruments is precluded by a stop 78, mounted on the casing and abutted by the edge of a channel stamping. With the retriever in close association with the latch plates, which have been moved forward with the sliding drawer bottom, the entire channel and web assembly is slid endwise out of the arm, moving the end plug, or arm plug with it, and exposing the desired sheave over or from which the old cord may be slipped laterally, on its free side opposite to the latch arm, and the new one replaced. The attachment of the cord to the anchor point in the casing and to the instrument may be quickly effected while the sheave is locked to the latch plates. In order to support the channel members in proper vertically positioned relation, a rectangular guide support 80 is provided at the rear of the casing, within which the channel stampings are guided, as will be clear.

I claim:

1. In a dental unit, an energy conducting cord, means imparting tension to the cord, an element movable in a single fixed predetermined path in response to movement of said cord, stop means disposed in the path of said element arranged to be abutted by said element to positively limit the movement of said cord, and means arranged to absorb the tension on said cord subsequent to the stopping abutment.

2. In a dental unit, an energy conducting cord, means imparting tension to said cord, means positively operable at a predetermined point in the movement of the cord to stop the movement of said cord, and means operable subsequent to the operation of the stop means to absorb the tension on said cord.

3. In a dental unit, a guide, a cord extensible through the guide, retrieving machanism tending to pull the cord in one direction relative the guide, a latch element movable with the retrieving mechanism in a single fixed predetermined path, tension controlling means disposed in said path in proximity to the guide arranged for positive interengagement with the latch element toward the end of the opposite movement of the cord through the guide, to absorb the pull of the retrieving mechanism on said cord.

4. In a dental unit, a longitudinally guided cord and retrieving mechanism, cooperating latch elements respectively pivotally mounted on the retrieving mechanism and fixed in the path of movement of the other cooperating latch element, arranged for interengagement and releasing disengagement in response to pulls on the cord opposed to the retrieving mechanism.

5. Tension controlling mechanism for retrievers of dental units, including a slotted and recessed plate, and an arm having a cross pin, the arm and plate susceptible to relative longitudinal movement in response to anti-retriever pull and arranged for relative lateral movement for interlocking and disengagement of the cross pin and the slots and recesses, also in response to anti-retriever pull.

6. In a dental unit, an instrument, a cord connecting the instrument with a source of energy, a retrieving mechanism including a sheave and means imparting a pull on the sheave, tension controlling mechanism including a movable arm, a latching element mounted on the arm, the arm arranged for movement with the retriever, means tending resiliently to maintain the arm in a predetermined position, the tension controlling mechanism including latch mechanism disposed in the path of travel of the latching element on said arm, means on the latch mechanism for serially interlocking and disengaging the latch element and the latch mechanism through movements of the arm under the influence of the resilient means, for relieving tension on the cord during the use of the instrument.

7. In a dental unit including cords and instruments, means for housing the cords and instruments, means for holding the instruments in a substantially horizontal common plane in their housed position, means movable to expose the instruments, and means responsive to the last named movement to actuate the instrument holder and simultaneously extend all of the instruments at an angle to the horizontal to facilitate grasping the instruments.

8. In a dental unit, a housing having a substantially horizontal planar upper surface, an instrument holder the axis of which normally lies in substantial parallelism with said upper surface, an instrument normally mounted in said holder, means movable to expose the instrument, and means synchronously actuated by the movable means to move the instrument holder so that its axis is angularly inclined to the plane of the upper surface of the housing.

9. In a dental unit including a plurality of instruments, an instrument holder for supporting a plurality of instruments, a housing for the instruments, means for moving the instrument holder and instruments from the housing, and means actuated by said movement to swing the instrument holder at an angle to the line of movement of said first mentioned means.

10. In a dental unit including instruments and cords connecting with sources of energy, a housing for the cords and instruments, a movable instrument holder presenting the instruments in a substantially fan shaped assembly, means for moving the instrument holder and instruments relative the housing, and simultaneously moving the instrument holder relative said means to facilitate grasping an instrument.

11. In a dental unit, a plurality of substantially parallel closely grouped cord guides, a purality of instruments, a horizontally pivotally supported instrument holder having instrument apertures the axes of which converge inwardly so as to terminate in substantial alignment with the respective cord guides, the instruments removably mounted in the respective apertures and outwardly divergent therefrom in substantial fan shape to facilitate grasping an instrument, and each normally disposed in a common substantially horizontal plane and arranged for movement as a unit with the holder so as to lie in a common plane angularly divergent from and intersecting the horizontal.

12. In a dental unit, a hollow arm, a casing carried by the arm, a unitary guide channel slidably mounted in the arm and extending into the casing, the guide channel including a vertical web terminating short of the channel members in the casing, an arm plug carried by the guide channel, looped cords and sheaves disposed in the channel members, a movable element carried by the casing and extensible into and from the space between the channel members beyond the termination of the web and arranged for interlocking engagement with the sheaves to facilitate replacement of the cords, and supplemental guide members carried by said movable element.

13. In a dental unit, a housing, an instrument, a cord connecting the instrument with a source of energy and being looped, a sheave disposed in the loop, tension means for the sheave, a resiliently held arm pivotally associated with the sheave so as to be movable therewith, with the arm resiliently urged to a predetermined position, and means in the path of movement of said arm for locking engagement therewith to absorb the tension on the sheave and to relieve the cord from tension during the use of the instrument.

14. In a dental unit, a latch plate having primary and secondary stop recesses, and a latch recess, and means for locking association therewith, the latch plate and means being relatively movable during the use of the dental unit.

15. In a dental unit, a housing, an instrument cord guide, a cord extended into the guide and looped in the housing, retrieving mechanism engaging the looped cord urging its movement one way through the guide, a movable element supporting the guide, a tension controlling device mounted on the movable element, means carried with the retrieving mechanism in a predetermined path such as to impinge upon the tension controlling device, the movable element arranged to expose or conceal the cord guide, the cord arranged to be extended through the guide to cause contact between said means and the tension controlling device, and the latter arranged to serially interlock and disengage said means to relieve and impart tension to said cord.

16. In a dental unit, a housing, an instrument, and a cord normally disposed in the housing, the cord being looped, a sheave in the loop, an arm pivoted on the axis of the sheave, a tension device engaging said arm and imparting tension to the sheave for retrieving the cord, means in the path of said arm during the normal movement of the cord for engagement with the arm for effecting a positive stop to the outward movement of the cord, said means and arm arranged for latching interengagement upon release of the cord, to relieve the cord of tension from the tension device, and the means and arm arranged for disengagement upon further outward pull on said cord to permit the cord to be housed.

17. In a dental unit, a housing, guide channels mounted in the housing including a web terminating short of one end of the channels, a movable element carried by the housing extended into the space between the channels, a battery of latch plates carried on the movable element and normally disposed in said space between the channels, a pivoted instrument holder carried by the movable member or element, instrument cords extending from the instrument holder into the channels, the movable element being arranged so as to be extensible partially from the housing so as to expose the instrument holder, means responsive to outward movement of the element to swing the instrument holder on its pivot to expose such instruments as are carried thereby, the battery of latch plates being movable with the element to a position clear of the channel members, means movable in a predetermined path between the channel members with the cord as it is extended from the housing arranged to engage and latch with the appropriate latch plates at the outer limit of the movement of the cord, and means effecting upon the disengagement of said means and the appropriate latch plates to retrieve the cord and dispose it in the housing.

18. In a dental unit, a pair of oppositely flared parallel spaced latch plates, each latch plate having identical guide surfaces, primary and secondary stop recesses, and a latch recess, and each having also a slot inclined therein communicating with the secondary stop recess and terminating substantially beyond the flare, a cooperating resiliently pivoted arm of such thickness as to slide between the latch plates, and having a cross-pin of greater length than the assembled thickness of the plates, substantially, the pin arranged for successive engagement with the guide surfaces, the primary stop recess, the latch recess, and secondary stop recess and the inclined slot during relative longitudinal movements of the arm and latch plates.

19. In a dental unit, an energy conducting cord, an element movable in a predetermined substantially rectilinear path in response to movement of said cord, means disposed in alinement with the rectilinear path of movement of said element and arranged for positive locking engagement therewith at a predetermined point in the movement of said cord to absorb the tension on said cord.

20. In a dental unit, a cord guide, a cord extensible through the cord guide, retrieving mechanism tending to pull the cord in one direction relative to the cord guide, a latch element, a substantially rectilinear guide with relation to which the latch element is movable in response to movement of the cord in a predetermined substantially rectilinear path, tension controlling means disposed in said path and located substantially between the cord guide and the retrieving mechanism and arranged for positive interengagement with the latch element at a predetermined point in the movement of said cord in one direction, to absorb the pull of the retrieving mechanism of said cord.

In testimony whereof, I affix my signature.

CLARENCE W. MOORE.